US011843516B2

(12) United States Patent
Ouyang et al.

(10) Patent No.: US 11,843,516 B2
(45) Date of Patent: Dec. 12, 2023

(54) FEDERATED LEARNING IN TELECOM COMMUNICATION SYSTEM

(71) Applicant: ASIAINFO TECHNOLOGIES (CHINA), INC., Beijing (CN)

(72) Inventors: Ye Ouyang, Beijing (CN); Lilei Wang, Beijing (CN); Aidong Yang, Beijing (CN)

(73) Assignee: ASIAINFO TECHNOLOGIES (CHINA), INC., Beijing (CN)

( * ) Notice: Subject to any disclaimer, the term of this patent is extended or adjusted under 35 U.S.C. 154(b) by 0 days.

(21) Appl. No.: 17/909,912

(22) PCT Filed: Mar. 10, 2020

(86) PCT No.: PCT/CN2020/078652
§ 371 (c)(1),
(2) Date: Sep. 7, 2022

(87) PCT Pub. No.: WO2021/179176
PCT Pub. Date: Sep. 16, 2021

(65) Prior Publication Data
US 2023/0146099 A1    May 11, 2023

(51) Int. Cl.
*G06F 15/173*    (2006.01)
*H04L 41/16*    (2022.01)
*H04L 41/50*    (2022.01)

(52) U.S. Cl.
CPC ............ *H04L 41/16* (2013.01); *H04L 41/50* (2013.01)

(58) Field of Classification Search
CPC ..... H04L 41/16; H04L 41/50; H04L 41/0894; H04L 43/08; H04L 41/0806; H04L 41/5041; H04L 41/145
USPC ......................................................... 709/224
See application file for complete search history.

(56) References Cited

FOREIGN PATENT DOCUMENTS

| CN | 110677299 A | 1/2020 |
|---|---|---|
| CN | 110798360 A | 2/2020 |
| EP | 13159734.6 A1 | 9/2014 |

OTHER PUBLICATIONS

International Search Report and Written Opinion filed in PCT/CN2020/078652, dated Dec. 9, 2020; 7 pgs.

*Primary Examiner* — Karen C Tang
(74) *Attorney, Agent, or Firm* — Vedder Price P.C.

(57) ABSTRACT

The present disclosure relates to federated learning in a telecom system. For a service request from a service requester, an intelligent service provider serves as a master intelligent service provider to perform federated learning in coordination with at least one additional intelligent service provider as slave intelligent service provider, and then merge the service-related information obtained from the at least one slave intelligent service and the service-related information of the master intelligent service provider so as to provide intelligent service for the service requester, or provide merged service-related information to slave intelligent service provider.

17 Claims, 6 Drawing Sheets

FEDERATED LEARNING IN TELECOM COMMUNICATION SYSTEM

FIELD OF THE INVENTION

The present invention belongs to a field of wireless communication, and relates to a wireless communication system operating according to $3^{rd}$ Generation Partnership Projection (3GPP) standards or equivalents or derivatives thereof, particularly relates to service providing in a telecom communication system.

BACKGROUND

Currently, the 3GPP Working Groups are defining a so-called "5G" (or "Next generation"), and 3GPP TSG SA2 Working Groups are specifying the system architecture and procedure for 5G system.

In order to provide network data analysis in 5G network, a network function called Network Data Analytics Function (NWDAF) has been specified. The NWDAF was initially specified in Rel.16 (3GPP TS 23.288), and has been defined as a component of 5GC (5G core) and can provide intelligence service to other components in the system. For example, the NWDAF can collect specific data from Network Functions (NFs), Operation Administration and Maintenance (OAM), Application Function (AF), etc., obtain analysis results by means of specific data analysis, and provide the analysis results to the NFs, OAMs, AFs, etc.

NWDAF is very critical for implementing network intelligentization, and currently its enhancement is under discussion.

Unless otherwise stated, it should not be assumed that any of the methods described in this section are prior art simply by being included in this section. Also, unless otherwise stated, issues recognized with respect to one or more methods should not be assumed as being recognized in any prior art on the basis of this section.

SUMMARY OF THE INVENTION

The present disclosure proposes an improved mechanism for NWDAFs in a telecom communication system, especially Federated learning mechanism. By means of federated learning, the service providing can be improved, and the work efficiency can be increased.

An aspect of the present disclosure relates to an intelligent service provider in a telecom communication system, the telecom communication system including the intelligent service provider and at least one additional intelligent service provider, the intelligent service provider comprise a processing circuitry configured to: for a service request from a service requester, cause the intelligent service provider to serve as a master intelligent service provider to perform federated learning in coordination with at least one of the at least one additional intelligent service provider as slave intelligent service provider, and merge the service-related information obtained from the at least one slave intelligent service and the service-related information of the master intelligent service provider so as to provide intelligent service for the service requester, or provide merged service-related information to slave intelligent service provider.

Another aspect of the present disclosure relates to An intelligent service provider in a telecom communication system, the telecom communication system including the intelligent service provider and at least one another intelligent service provider, the intelligent service provider comprise a processing circuitry configured to: for a service request from a service requester, cause the intelligent service provider to serve as a slave intelligent service provider to perform federated learning in coordination with one of the at least one another intelligent service provider as a master intelligent service provider, and provide service-related information obtained via the federated learning to the master intelligent service provider so that an intelligent service can be provided by the master intelligent service provider for the service requester.

Yet another aspect of the present disclosure relates to a non-transitory computer-readable storage medium storing executable instructions that, when executed, implement the method as previously described.

Yet another aspect of the present disclosure relates to a device. According to an embodiment, the device includes a processor and a storage device, and the storage device stores executable instructions that, when executed, implement the method described above.

This section is provided to introduce some concepts in a simplified form that will be further described below in the detailed description. This section is not intended to identify key features or essential features of the claimed subject matter, nor is it intended to be used to limit the scope of the claimed subject matter. Other aspects and advantages of the technology will become apparent from the following detailed description of the embodiments and the accompanying drawings.

DESCRIPTION OF THE DRAWINGS

The above and other objects and advantages of the present disclosure will be further described below with reference to specific embodiments and with reference to the drawings. In the drawings, the same or corresponding technical features or components will be denoted by the same or corresponding reference symbols.

The embodiments described in this section may be susceptible to various modifications and alternative forms, and specific embodiments thereof are shown by way of example in the drawings and are described in detail herein. It should be understood, however, that the drawings and detailed description thereof are not intended to limit the embodiments to the disclosed particular forms, but rather, the intention is to cover all modifications, equivalents, and alternatives falling within the spirit and scope of the claims.

DETAILED DESCRIPTION OF EMBODIMENTS

Hereinafter, exemplary embodiments of the present disclosure will be described with reference to the accompanying drawings. For clarity and conciseness, not all features of an embodiment are described in the specification. However, it should be understood that many implementation-specific settings must be made during the implementation of the embodiment in order to achieve specific goals of the developer, for example, to meet those restrictions related to equipment and business which may change depending on the implementation. In addition, it should also be understood that, although development work may be very complex and time-consuming, it is only a routine task for those skilled in the art benefiting from this disclosure.

Here, it should also be noted that, in order to avoid obscuring the present disclosure by unnecessary details, only processing steps and/or equipment structures that are closely related to at least the solution according to the present disclosure are shown in the drawings, while other details of little relevance to this disclosure are omitted.

Figure 1:
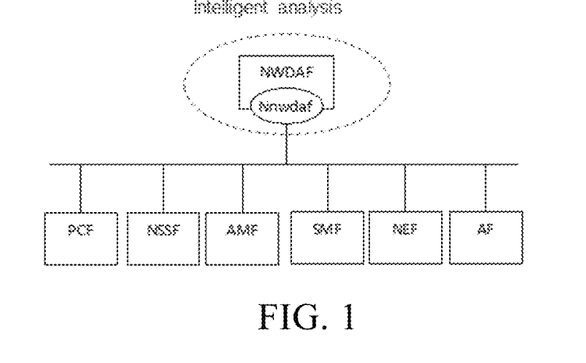
FIG. 1 schematically illustrates communication between NWDAF and NFs.

FIG. 1 schematically illustrates communication between NWDAF and some NFs in a wireless communication system, such as telecom communication system, wherein the NWDAF can communicate, via its interface based on service (Nnwadaf), with the NFs, so that the NWDAF can cooperate with the NFs to, for example, provide intelligent service, such as data analysis, processing, inference, monitoring, etc. for NFs, as well as training a system model, such as Artificial Intelligence (AI) system model. The NFs can include, not limited to, Policy Control Function (PCF), Network Slice Selection Function (NSSF), Authentication Management Function (AMF), Session Management Function (SMF), Network Exposure Function (NEF), Application Function (AF), and other Functions.

An exemplary operation between the NWDAF and NFs is as follows. The NWDAF provides slice specific network data analysis (e.g., local level information) to the Policy Control Function (PCF), and the Network Slice Selection Function (NSSF) on a network slice level. NWDAF notifies/publishes slice specific network status analytics information to the PCF (s) and NSSF that are subscribed to it. PCF(s) and NSSF can collect directly slice specific network status analytic information from NWDAF. The PCF uses that data in its UE and network related policy decisions. The NSSF may use the local level information provided by NWDAF for purpose like slice selection and more.

NWDAF is very critical for implementing network intelligentization, and its capability of collecting and processing data is important for service providing as well as model training. However, current configuration of the NWDAF may exist some shortcomings.

Usage of single NWDAF. A single NWDAF may have limited capability of collecting data so the performance of data processing, inference may be bad. The reason may be the area managed by NWDAF has limited data for training. Furthermore, a single NWDAF itself has limited capability of data processing due to software/hardware resource restriction. Therefore, it is difficult for a single NWDAF to timely and efficiently train AI model as well as providing some intelligent services.

Centralized data processing may cause delay of service providing and model training, as well as unbalanced distribution of data load.

Usage of multiple NWDAFs. Respective NWDAF may be managed by different vendor, operator or department of the same operator, and the trained data collected by one NWDAF cannot be shared to other NWDAF due to security regulation or protection purpose. Therefore, the performance of inference may be adversely influenced to some extent.

The present disclosure is proposed in view of the above, and its key value is to provide a mechanism on supporting federated learning in a telecom communication system, which has not been addressed before.

According to the present disclosure, the federated learning in the telecom communication system can be implemented by establishing a master-slave relationship between at least two entities in the system for providing intelligent service, which can be referred to as intelligent service providers, so as to perform federated learning, wherein the master is responsible for requesting/activating federated learning for the slaves, collecting service-related information from the slaves, and can provide service based on the service-related information from the slaves. The federated learning can be triggered by a service request from an entity of the system for requesting a kind of service, which can be referred to as a service requester, such as NFs, controllers, or other entity. The establishment and operations of the master and slaves for federated learning will be described as below.

According to the present disclosure, considering that a telecom communication system, such as 5G system, has specific signaling or protocol mechanism used for communication, the federated learning mechanism according to the present disclosure shall be implemented based on some properties, signals and indicator/parameters of the system and/or the intelligent service provider specific for the telecom communication. In an embodiment, establishment and operations of federated learning can be signaled by means of specific signals, such as broadcast signals and/or dedicated signals on a broadcast and/or specific channel from a controller and/or among service providers, and/or, the establishment, operations of federated learning also consider indicator/parameters for communication. For example, location, functionality, operating capability, performance indicator specific for communication can be utilized for federated learning, such as establishment, deployment, activation, operation, etc. of the federated learning.

The federated learning belongs to a kind of artificial intelligence technique in which respective participants or entities (also is referred to as data owner) or client can cooperate to perform data processing, such as model training, etc., and respective participant does not need to expose it data to other participants or coordinators such as various servers, so that the federated learning can protect consumer privacy and data security well. The federated learning according to the present disclosure can be implemented by means of any type of federated learning or federated learning algorithm, for example, Horizontal Federated Learning, Vertical Federated Learning, Federated Transfer Learning, which are known in the art, or other types of federated learning or equivalents or derivates in future. Therefore, the details will not be described herein.

Hereinafter, some specific embodiments according to the present disclosure will be described in detail with reference to the accompanying drawings.

According to an embodiment of the present disclosure, there provides an intelligent service provider in a telecom communication system, the telecom communication system including the intelligent service provider and at least one additional intelligent service provider, and the intelligent service provider comprises a processing circuitry which is configured to for a service request from a service requester, cause the intelligent service provider to serve as a master intelligent service provider to perform federated learning in coordination with at least one of the at least one additional intelligent service provider as slave intelligent service provider, and based on service-related information obtained from the at least one slave intelligent service, provide intelligent service for the service requester.

The intelligent service provider may mean a component in the system which can perform specific processing, execute specific operations, achieve specific functionality, etc., such as NWDAF, or other similar functional components, and the service may correspond to such processing, functionality, operations, etc. or its result, as required or instructed. In an embodiment, the intelligent service provider may be at the base station side in a telecom communication system, and in this disclosure, the term "base station" has the full breadth of its usual meaning and includes at least a wireless communication station that is used as a part of a wireless communication system or a radio system to facilitate communication. As an example, the base station may be, for example, an eNB in a 4G communication standard, a gNB in a 5G communication standard, a remote radio head, a wireless access point, a UAV control tower, or a communication apparatus performing similar functions.

The intelligent service requester may mean a component in the system which can request/instruct the provider to perform such specific processing, functionality, operations, etc., such as various NF, OAM, AF, controller, etc. In an embodiment, the intelligent service requester may be at the UE side in the telecom communication system, and in this disclosure, the term "user equipment" or "UE" has the full breadth of its usual meaning and includes at least terminal equipment that is used as part of a wireless communication system or a radio system to facilitate communication. As an example, the UE may be a terminal equipment such as a mobile phone, a laptop computer, a tablet computer, a vehicle on-board communication apparatus, or the like, or an element thereof.

Note that the intelligent service provider and requester is classified mainly based on their functionality and role in the communication, instead of being limited to the above specific implementation. For example, the provider and requester can both belong to NWDAF, or both belong to NF, or both at the base station side, or both at the UE side, or at UE side and base station side respectively, or any other configuration.

According to an embodiment of the present disclosure, such intelligent service may relate to various data processing service, such as data analysis, data tracking, data monitoring, information inference, etc.; various system management service, such as network management, optimization, etc.; or the like, and in such a case, the service-related information may include information about service result, or information about model used for providing the service.

In an embodiment, the provide intelligent service can include merging service-related information obtained from the at least one slave intelligent service provider. In another embodiment, the provide intelligent service can include merging service-related information obtained from the at least one slave intelligent service and the service-related information of the master intelligent service provider. Then the intelligent service can be provided based on the merged service-related information. Note that the merging can be implemented in a variety of manners known in the field of information processing, such as collection of the information, further processing based on all the information, etc., and will not be described in detail.

In an embodiment, the service-related information from the slave may include a partial service result, which may mean the service provided by the slave intelligent service provider and which may belong to a part of final service to be provided to the service requester or as a basis of the final service. In such a case, the master intelligent service provider can be configured to merge the partial service results provided by the at least one slave intelligent service provider and additionally or optionally, the partial service result provided by the master intelligent service provider itself, to provide an intelligent service for the service requester. Such merge can be performed in a variety of manners, for example, collection of the partial service results, further processing based on all the partial service results to obtain the final service, etc.

In an embodiment, the service-related information can include information related to an intelligence model of the system which may be trained for providing service, such as an AI model of the system. And in such a case, the master intelligent service provider may be configured to merge the model information provided by the at least one slave intelligent service provider to build a global intelligent service model, and utilize the global intelligent service model to provide intelligent services for the service requester. The information related to the intelligent model may include a sub-model which may be a part of the global model, and/or may include model parameters for constituting the global model. Such merge can be performed in a variety of manners for constituting the global model, for example, combination of the respective models/model parameters to build the global model, further processing based on all the models/model parameters to build the global model, any other manners for building the global model based on sub-models/model parameters, and will not described in detail.

In an embodiment, the master intelligent service provider can feedback service result to the slave intelligent service providers or any other requester for inference. In an embodiment, the master intelligent service provider can feedback the parameters of the global model to the at least one slave intelligent service provider for updating. Such feedback can be performed in a variety of manners. For example, the feedback can be performed by the master actively, or can be performed in a request/response manner, or can be in other manner.

In an example, the master intelligent service provider can feedback the model parameters to the slave master intelligent service provider once the model is built and/or optimized at the master intelligent service provider. In another example, the master intelligent service provider can feedback the model parameters to the slave master intelligent service provider periodically, for example, after a predetermined time duration since the global model is built and/or optimized. For example, the feedback can be performed before next round of federated learning. In yet another example, the master intelligent service provider can feedback the model parameters to the slave master intelligent service provider when a request is received from the slave master intelligent service provider.

According to an embodiment of the present disclosure, additionally or alternatively, such intelligent service may further relate to model training, and in such a case, the service-related information may include information about the model training, such as sub-model, model parameters. In such a case, the master and slaves can communicate the information about model training therebetween in a variety of manners, such as periodically, request and response, etc. The master can feedback the information to the slave in a way similar with the above. The slave also can present the information about model to the master for model training.

In another embodiment, the slave intelligent service provider can provide model parameters to the master intelligent service provider in a variety of manners. In an example, once the model parameters are obtained by the slave intelligent service provider, the model parameters can be provided to the master intelligent service provider. Furthermore, such model parameters can be provided periodically or according to a request from the master intelligent service provider.

Note that service providing and model training can perform separately or combinedly, and thus respective information can be communicated separately or combinedly. For example, service providing and model training can be performed concurrently and the communicated information may be used for both of service providing and model training, such as the information about model as described above.

Note that the communication between the master and slaves, between the providers and requesters, as well as the providers and other entities can be via any appropriate signal, protocol, channel, path, form, etc., which are known in the telecom communication, as long as the status information about establishment and the data about federal learning can be securely transmitted. And thus it will not be described in detail.

According to an embodiment of the present disclosure, in addition to federated learning, the master intelligent service provider can perform other functionality. In particular, NWDAF can be in charge of key management for encryption/de-encryption during the federated learning.

According to an embodiment of the present disclosure, the master and slave intelligent service providers shall be established for federated learning. In consideration that for each kind of processing/service, there may exist a corresponding federated learning mechanism, and each federated learning mechanism may be performed iteratively, the establishment can be performed for all kinds of federated learning, for each federated learning, or even for each iteration of the federated learning.

In an embodiment, the establishment can be implemented in a variety of manners, such as be based on time, voting, pre-defined conditions, coordination of any other entity, pre-configured, hard-coded or any combination of them. And the establishment information, also can be referred to a status information, for example, which one is the master and/or which ones are the slaves, can be signaled to the providers, or requester, or other entity in any appropriate manner, such as via broadcast signal, or specific signal before or during the federal learning. Additionally and alternatively, such establishment information also can be arranged in some specific data area of signal, such as a field or bit, indicating whether a provider is a master or a slave. Therefore, the status and roles of respective providers can be explicitly known. The establishment information can be represented in any appropriate form, such as list, table, map, etc., which may include the master information, and additionally or optionally, the slave information such as the slaves and their correspondence with the master.

In an embodiment, the establishment can be implemented by any appropriate entity, such as the intelligent service provider, the service requester, any coordinator, any controller entity in the system, and the like.

In an embodiment, the establishment can be implemented at any appropriate time. For example, such establishment can be implemented in advance, and the establishment information can be statically configured, such as fixedly preset in advance, and/or can be dynamically configured, such as before each federated learning or each iteration in the federated learning, or on demand, receipt of any request, and the like.

In an embodiment, the establishment can be implemented based on characteristic of the intelligent service provider, particularly functional and/or performance characteristic in the telecom communication system or a kind of federated learning. For example, the characteristic may include location, functionality, workload, service capability, Key Performance Indicators (KPIs), and the like for telecom communication or for the kind of federated learning.

Hereinafter, the embodiment related to establishment of master and slave intelligent service providers can be described as follows. In an example, at least two intelligent service providers can form a group for federated learning, and in the group, one intelligent service provider is set as the master, and at least one of the others may be automatically set as the slaves. For example, all the others are automatically set as the slaves, or at least one of the others can be set as the slaves in accordance with some criteria.

In an embodiment, the master can be set arbitrarily or by default. Such as pre-configured, such as indicated by any indication information, or hard-coded. For example, NWDAF A is implemented as master NWDAF by default. NWDAF B and C are implemented as slave NWDAF.

In an embodiment, the master can be set in accordance with operation subsequence, and an intelligent service provider firstly receiving the service request can serve as the master intelligent service. For example, for at least two NWDAFs, when a NF transmits a request for service, one NWDAF who firstly receives the request serves as the master.

In an embodiment, the master can be set in accordance with location information, and an intelligent service provider which is located more closer to the requester, particularly at the same service area, such as a cell, as the requester can be preferably established as the master. Note that such location information may include physical distance in the space, and alternatively may include communication path distance, such as presented by number of relays thereamong. For example, for at least two NWDAFs, when a NF transmits a request for service, one NWDAF who is at the same cell as the requester serves as the master.

In an embodiment, the master can be set in accordance with service capability of the intelligent service provider specific for the system or specific for the kind of the federated learning, such as data processing capability, processing capacity, etc. In an embodiment, the service capability can include a computing ability, a resource utilization rate and the like of the intelligent service provider, which may characterize the capability of the intelligent service provider for providing service, such as data analysis, model training. For example, an intelligent service provider having the best service capability serves as the master.

In an embodiment, an intelligent service provider can be coordinated as the master intelligent service provider by various entities. In an example, such coordination can be performed by a system controller, service requester, or other components in the system. For example, NRF, PCF or any other NF is used to coordinate master and slave relation of NWDAFs so as to set a master. In another example, such coordination can be performed by intelligent service providers, such as a group of intelligent service providers. Such coordination can consider the service capability of the intelligent service provider, as described above. For example, the intelligent service providers can be voted based on certain preconfigured conditions like computing ability, resource utilization ratio, etc., and the one having more votes becomes the master. And the coordination result can be signaled to the master via any appropriate communication signaling, protocol, or other means.

In an embodiment, the slaves can be established via coordination by the same or different entity than the master in consideration with the same factor, such as location, service capability, etc. In another embodiment, the salve can be set by the master. That is, after the master is established, the master can determine which intelligent service provider can serve as the slave in a manner similar with the above. Such determination can be directed to a predetermined group, a predetermined number of providers, etc.

In an embodiment, the master intelligent service provider can be configured to, based on the amount of available trained data and/or based on performance indicators provided by another intelligent service provider, determine whether another intelligent service provider can participate in federated learning as the slave intelligent service provider. In an embodiment, the performance indicator includes at least one of throughput, reliability, and delay of the intelligent service provider. In an example, when a performance indicator indicates the intelligent service provider does not satisfy a specific requirement, the intelligent service provider cannot serve as the slave. For example, the throughput, reliability is lower than a corresponding threshold, or the delay is too high to beyond a threshold, the intelligent service provider cannot serve as the slave. On the contrary, when the throughput, reliability is higher than a corresponding threshold, or the delay is lower than a threshold, the intelligent service provider can serve as the slave. Note that if there exists information indicating the provider can serve a slave, such as indicated in a specific data field or bit in the information, the determination by the master can be skipped, or the master can still perform the above determination, and only when the provider satisfy the requirement, the provider can be determined as serving as a slave.

Note that the information for establishment of master and slave can be presented to an entity for such establishment in appropriate manner, such as notified in advance, notified in a request-response manner, etc. For example, the related information can be obtained by the master in a request-response manner for establishment of slaves, wherein the master can request a provider to present information related to such establishment and the provider presents the information as response. Then, the master can make determination based on the received information. Of course, such information also can be obtained by the master from a storage device or other sources.

Note that if the total number of providers for federated learning is limited, the intelligent service providers except of the master can be ranked, such as in accordance with their trained data, performance indicator, etc., and the first predetermined number of intelligent service providers will serve as the slaves. For example, if the total number is limited to N, the first N−1 intelligent service providers will serve as slaves. Such total number can be indicated in a specific data area, field or bit in the master.

Figure 2:
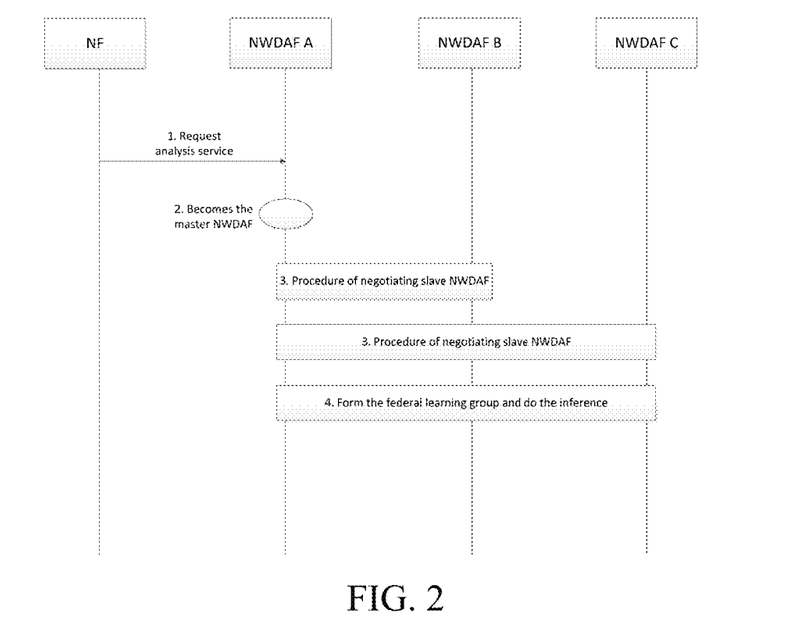
FIG. 2 illustrates a procedure that a master NWDAF and two slave NWDAFs are established according to an embodiment of the present disclosure.

Hereinafter an exemplary procedure for establishing master and slave intelligent service providers will be described with reference to FIG. 2, wherein NWDAF is taken as an example of the intelligent service provider.

Firstly, analysis service request from a NF (network function) is transmitted to a master NWDAF. In an example, NWDAF A can serve as a master NWDAF for performing federated learning, for example, the establishment of NWDAF A can be performed as discussed above. Then, the master NWDAF will triggers the procedure to negotiate slave NWDAFs with NWDAF B and C. For example, at least one of the NWDAF B and C may be slaves as described above.

In operation, the NF can send a request directly to a group whose master and slaves have been established and whose establishment information has been notified to the NF. Alternatively, the NF can send a request to a group for federated learning as notified by a controller or other entity of the system in a broadcast signal or similar signal, or the NF can send a request to the controller or other entity and the controller or entity can direct the request to a group for federated learning based on some properties of the group, such as location, service capability (which may be obtained based on service capability of each provider, such as addition, weighted addition, any other combination, etc.) When the request is received by the group, the master and salves in the group can be established as discussed above.

Therefore, the master and the slave NWDAFs can establish a federated learning group for performing service or model training.

According to an embodiment of the present application, the establishment procedure as described above is also applicable to a case that when a new intelligent service provider tries to join an established federated learning group.

In an embodiment, when a new intelligent service provider tries to join the federated learning, the new intelligent service provider and the established federated learning group can form a new group, and new master and slave can be determined therefrom, such as in a manner similar with the above.

In another embodiment, when a new intelligent service provider tries to join, the existing master can determine whether such new intelligent service provider can serve a slave. Such determination can be performed in a manner similar with the determination of slaves by the master as described above. If can, such new intelligent service provider will join to form a new group for federated learning. Note that if the total number of intelligent service providers for federated learning is limited, an existing slave with lowest rank will be excluded. If cannot, the new intelligent service provider can try to join other group for federated learning, or constitute a new group for federated learning.

Note that in an embodiment, there may exist an information indicating whether the slave determination of the master is enabled, and such information can be in any appropriate form, such as a binary value, symbol, etc., and can be configured for the master during establishment of the master, such as by broadcast signal or other communication means, or can be preset for the master. Therefore, the determination by the master also shall consider the information. For example, a binary value 1 indicates that the determination is enabled, 0 indicates that the determination is disabled. Then, when the binary value 1 is configured for the master, the master can determine slaves. If the binary value 0 is configured for the master, the master will not make such determination, and pre-configured slaves will perform federal learning, and if a new provider tries to join, a new group will form and new master and slaves will be established as discussed above.

Figure 3:
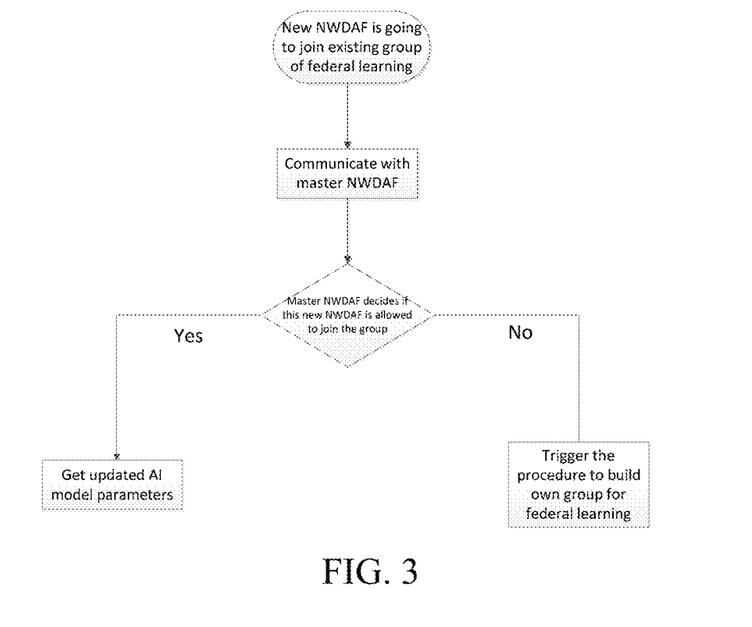
FIG. 3 illustrates a procedure that a new NWDAF tries to join an existing group doing federated learning according to an embodiment of the present disclosure.

Hereinafter an exemplary procedure that a new intelligent service provider tries to join an existing group doing federated learning according to an embodiment of the present disclosure will be described with reference to FIG. 3, wherein NWDAF is taken as an example of the intelligent service provider.

When a new NWDAF (for example NWDAF D) is going to join existing group of federated learning (e.g., NWDAF A, B, C), it needs to communicate with master NWDAF (NWDAF A). If master NWDAF A allows NWDAF D to join by means of judgment as described above, NWDAF D will get updated AI model parameters later from master NWDAF. Then, such NWDAF D can participate in the subsequent federated learning. If not, NWDAF D triggers the procedure to build its own group for federated learning.

According to an embodiment of the present disclosure, during federated learning, the master intelligent service provider can determine whether a slave intelligent service provider is workable for federated learning, that is, whether the service-related information provided by a slave intelligent service provider is available for providing service or model training. If not, the service-related information provided by the slave intelligent service provider will be excluded. Such determination can be performed in accordance with some criteria, for example, according to an activity level of the slave intelligent device or performance-related information provided by the slave intelligent service provider.

In an embodiment, the performance-related information may be a service performance metric of the slave intelligent service provider, and the master intelligent service provider is configured to: calculate the difference between the current service performance metric and the previous service performance metric of the slave intelligent service provider, and in a case where the difference is greater than a specific threshold, judge that the service-related information provided by the intelligent service provider is available. In another embodiment, the performance-related information can indicate whether a service performance of the slave intelligent service provider, such as current and previous performance difference, is greater than a specific threshold, and may be represented in any appropriate form, such as a binary value, symbol, etc. In a case where the indicator indicates that the service performance difference is greater than a specific threshold, it is judged that the service-related information provided from the slave intelligent service provider is valuable.

In an embodiment, if all slaves are not workable as judged above, for performing the federated learning, the master can select a predetermined number of slaves whose performance are better, for example, with higher ranking, for the federated learning. Alternatively, the master can constitute new group for federated learning, or switch off the federated learning.

Note that there may exist an information indicating whether the workable judgment of the master is enabled, and such information can be in any appropriate form, such as a binary value, symbol, etc., and can be configured for the master during establishment of the master, such as by broadcast signal or other communication means, or can be preset for the master. Therefore, the master can perform workable judgement in consideration of the information. For example, a binary value 1 indicates that the judgement is enabled, 0 indicates that the judgement is disabled. Then, when the binary value 1 is configured for the master, the master can judge whether the service-related information is available. If the binary value 0 is configured for the master, the master will not make such judgement, and all service-related information will be utilized.

Hereinafter, the process for determining whether a certain slave NWDAF is workable will be described with reference to FIG. 4, wherein NWDAF is taken as an example of the intelligent service provider.

Figure 4:
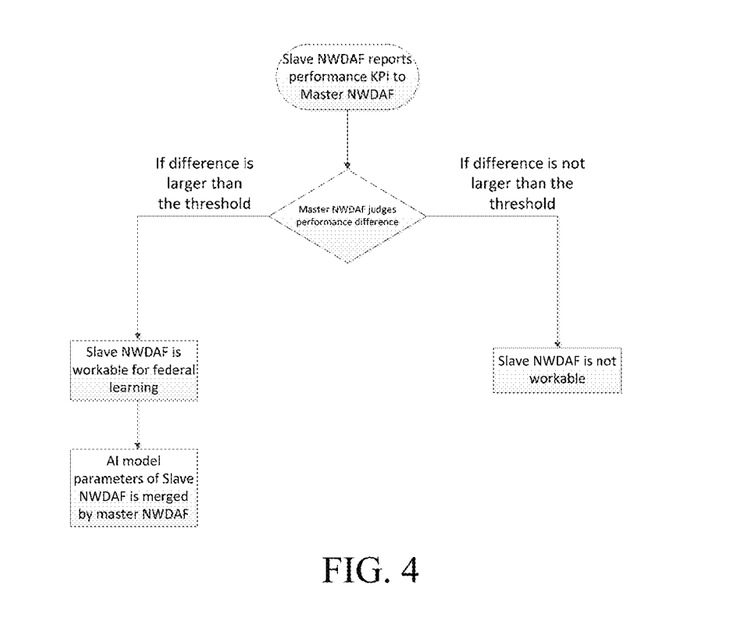
FIG. 4 illustrates a procedure that it is determined whether a certain slave NWDAF is workable for federated learning according to an embodiment of the present disclosure.

As shown in FIG. 4, a slave NWDAF reports performance KPIs (e.g., throughput, latency or reliability) to master NWDAF which judges performance difference (current one and previous performance). If the difference is larger than certain threshold, the AI model parameters reported by the slave NWDAF are used for model training (optimization). Otherwise, master NWDAF thinks slave NWDAF is not workable so relevant AI model parameters are not used for model training.

Note that such workable determination can operate for each or certain kind of federated learning, or each iteration or a predetermined number of iterations in a federated learning.

In an embodiment, for a kind of federated learning, if a slave is determined as not workable for the federated learning, the slave will not participate in all processes in the federated learning. Of course, the slave still can try to participate in other kinds of federated learning, as long as it is established as slave and/or determined as workable. In another embodiment, for an iteration in the federated learning, if a slave is determined as not workable for this iteration, the slave may still can try to participate in subsequent iterations of the federated learning. Or, the slave will not participate in a specific number of subsequent iterations in the federated learning, and when the salve returns to the federated learning, its performance will be estimated again.

According to an embodiment of the present disclosure, the federated learning can be switched on or off so that the service can be provided by the intelligent service provider adaptively. In an embodiment, the master intelligent service provider is capable of switching on or off the federated learning according to a request for a service requester, a request from a consumer, or a performance of the intelligent service provider. The performance may be that as described above, such as service performance which can be presented by KPI. In an example, when the performance of the intelligent service provider, including the master and/or slave, cannot satisfy performance requirement, the federated learning will be switched off. In another example, when it is judged that no intelligent service provider can serve as a slave intelligent service provider in a manner as above, the federated learning can be switched off.

Note that there may exist an information indicating whether the switch-on/off control of the master is enabled, and such information can be in any appropriate form, such as a binary value, symbol, etc., and can be configured for the master during establishment of the master, such as by broadcast signal or other communication means, or can be preset for the master. Therefore, the master can perform switch-on/off in consideration of the information. For example, a binary value 1 indicates that switch-on/off is enabled, 0 indicates that the switch-on/off is disabled. Then, when the binary value 1 is configured for the master, the master can judge whether the federated learning shall be switched-off. If the binary value 0 is configured for the master, the master shall try to implement federated learning all the time, as discussed above.

According to an embodiment of the present disclosure, the establishment of master and slaves is logical. In particular, the establishment of master and slaves is implemented for certain kind of federated learning, even certain iteration in the federated learning, and an intelligent service provider may be common to multiple groups for federated learning, and may serve as master or slave. Furthermore, it is possible the roles of the master and slaves may vary for federated learning dynamically.

In an example, the master intelligent service providers in one group for a kind of federated learning may be a slave in another group for another kind of federated learning, and in another example, such vary may happen across iterations in the federated learning. Therefore, during each federated learning or each iteration in a federated learning, the master and slaves can be re-determined.

Figure 5:
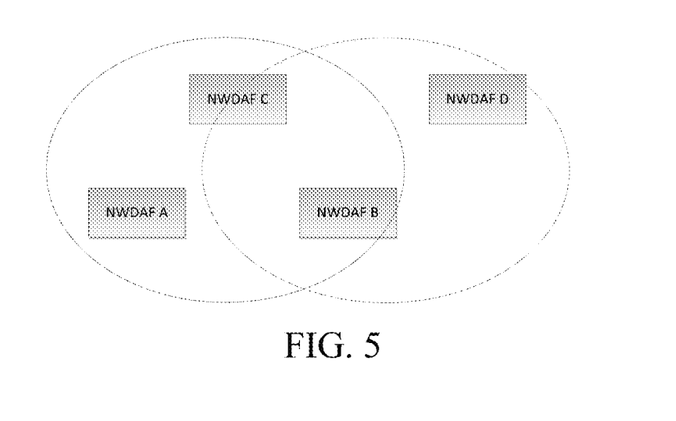
FIG. 5 illustrates logical establishment of master and slave intelligent service providers according to an embodiment of the present disclosure.

FIG. 5 illustrates a case that the establishment of Master/slave NWDAF is logical and for certain service. As shown in FIG. 5, service experience Analysis is provided by NWDAF C (master) and NWDAF A&B (slave master) while load analysis is provided by NWDAF B (master) and NWDAF C&D (slave master). One NWDAF (NWDAF B and C) may support multiple federated learning groups for supporting multiple services. It may be the master NWDAF for one service but the slave NWDAF for another service.

Note that the above mentioned NWDAF is only exemplary, and the present disclosure also can be applied to any kinds of processing units/functions in the telecom communication system, even wireless communication system, which can provide intelligent service and perform model training for the system, such as any other intelligent entity like RIC (radio intelligent controller) defined by O-RAN, or MDAF defined by 3GPP SA5. And the basic idea of the present invention can be applied to other kinds of telecom communication system, such as new generalization network system subsequent to 5G system.

Figure 6:
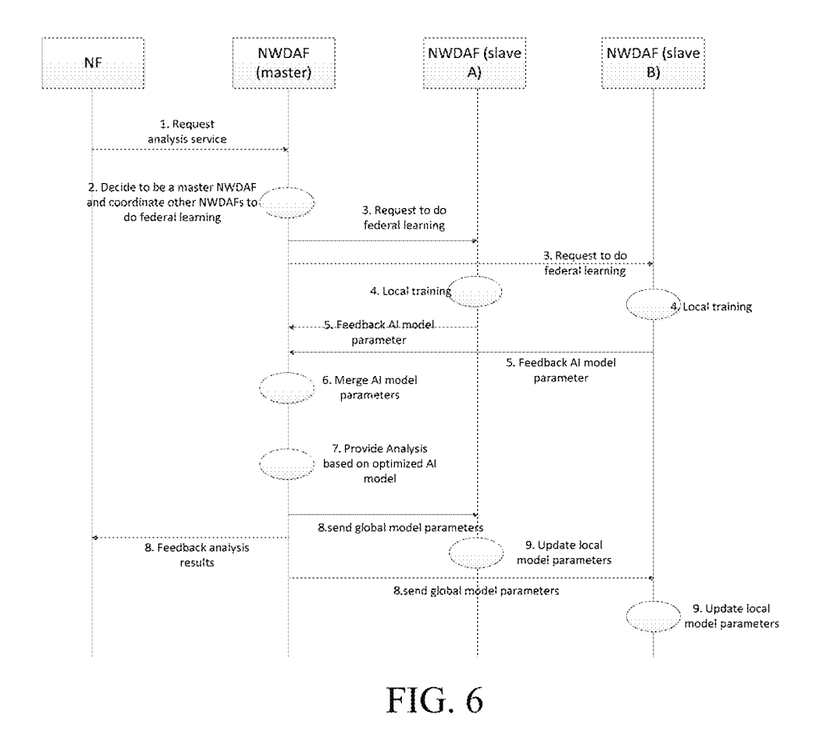
FIG. 6 illustrates a flowchart of an exemplary process of the federated learning of NWDAFs according to an embodiment of the present disclosure.

Hereinafter, an exemplary embodiment of a procedure of forming federated learning group and providing inference will be described with reference to FIG. 6. The basic operation steps are as follows.

Firstly, NF (e.g., AMF, SMF, UPF) requests analysis service from a NWDAF, and as discussed above, the NWDAF which firstly receive the request can serves as the master NWDAF.

Then, the NWDAF receiving the request decides to be a master NWDAF and coordinates other NWDAFs to do federated learning, wherein the slaves can be established in a manner as described above. For example, the salves can be pre-configured, can be determined concurrently with the master, or can be determined by the master.

Hereafter, the Master NWDAF requests slave NWDAFs to do federated learning, and the Slave NWDAFs do local AI model training, and feedback AI model parameters to master NWDAF. The AI model parameters may be a part of or all of the total parameter for the AI model.

Then, the Master NWDAF merges the received AI model parameters, and optionally and additionally, AI model parameters generated by the Master, to optimize AI model. Note that before or during receiving the AI model parameters, the Master can determine whether the slave is workable. For such determination, the slave will transmit some other parameters, such as performance information, as discussed above. And if a slave is not workable, its AI model parameters will not be received, or even received, will not be utilized for merging.

Hereafter, Master NWDAF provides service based on optimized AI model. For example, by means of the optimized AI model, the Master can perform data analysis, inference, etc. Alternatively, if the federated learning is used for model training, the operation of service providing can be omitted.

Then, Master NWDAF sends global model parameters to slave NWDAF, and/or provide analysis results to NF, and Slave NWDAF updates local model parameters. The communication between the Master and the Slave can be executed in a manner as described above.

Therefore, a procedure of federated learning is complete. Note that the procedure may relates to an iteration in a federated learning when the federated learning will execute iteratively, and the next iteration will further execute based on the optimized model. The iteration can be stopped when the service result can satisfy the request requirement or some criteria. For example, the output of the model, such as data analysis accuracy, etc., is higher than a threshold, or the number of iterations reaches a predetermined number, and the like. The stopping of iteration can be implemented in a variety of manners, and will not be described in detail.

In the federated learning according to the present disclosure, data of each intelligent service provider can be securely utilized for a local process in the intelligent service provider, such as service providing, model training, and the like, without needing gathering data which are common for all providers nor needing gathering all data from respective providers to a specific component for processing. Therefore, the federated learning can efficiently improve processing efficiency, while ensuring communication security.

Note that the above described operations performed by the intelligent service provider according to the embodiments of the present disclosure may be implemented by an electronic device on the intelligent service provider side, which may be separated from the intelligent service provider, may be a part of the intelligent service provider, such as a component, member, etc. thereof, or even may also be the intelligent service provider per se. For example, the intelligent service provider is at base station side, the present disclosure even can be performed by the base station per se, any component of the base station, or any entity associated with the base station.

The intelligent service provider can be implemented in a variety of manners. It should be noted that the intelligent service provider according to the present disclosure may further include units for performing operations performed by the processing circuitry as described above, as shown in FIG. 7A, which illustrates a block diagram of an intelligent service provider according to an embodiment of the present disclosure, i.e. the master intelligent service provider.

Figure 7A:
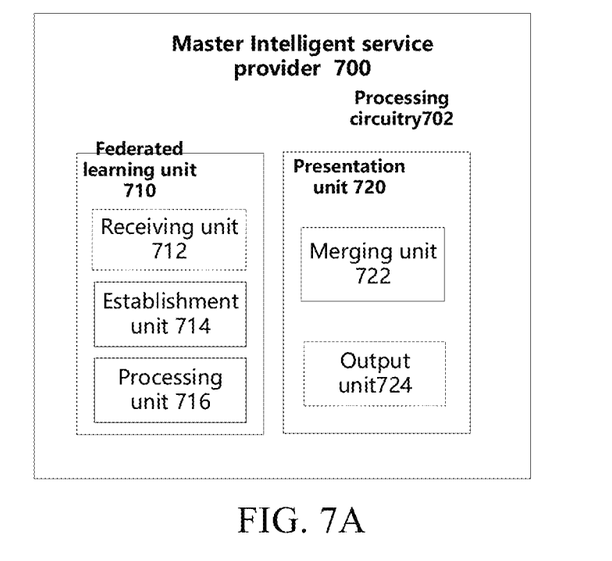
FIG. 7A illustrates a block diagram of an intelligent service provider according to an embodiment of the present disclosure.

According to an embodiment of the present disclosure, the intelligent service provider 700 may include various units for implementing the above functions, such as a federated learning unit 710 for performing federal learning with respect to a requested service, and a presentation unit 720 for providing the service result or service-related information, as described above.

Preferably, the federated learning unit 710 which may include a receiving unit 712 for receiving request, an establishment unit 714 for establishing master and slave, and a processing unit 716 for performing federated learning. Of course, at least the units 712 and 714 may be outside of the federated learning unit.

Preferably, the presentation unit 720 may include a merging unit 722 for processing the information from the slaves to obtain service result, and an output unit 724 for outputting the service result or service-related information. Of course, at least the output unit 724 may be outside of the presentation unit.

Note that such receiving unit and output unit can be combined into a communication unit for the receiving and outputting operation, and also can communicate other information to and from the requester or other entity in the system. Of course, there may exist a separate communication unit for communicating other information to and from the requester or other entity in the system.

Preferably, the intelligent service provider can further include determination unit for determining whether an intelligent service provider can serve as a slave, as well as determining whether a slave is workable, and the like.

It should be noted that although the units are shown in the processing circuitry 702, it is only exemplary, and at least one of such units also can be outside of the processing circuitry, even out of the intelligent service provider. Each of the above units is only a logical module divided according to a specific function implemented by it, instead of being used to limit a specific implementation manner, and for example, such units as well as the processing circuitry and even the intelligent service provider may be implemented in software, hardware, or a combination of software and hardware. In an actual implementation, the foregoing units may be implemented as independent physical entities, or may be implemented by a single entity (for example, a processor (CPU or DSP, etc.), an integrated circuit, etc.). In addition, the above-mentioned respective units are shown with dashed lines in the drawings to indicate that these units may not actually exist, and the operations/functions they implement may be realized by the processing circuitry itself.

It should be understood that FIG. 7A is merely a schematic structural configuration of the intelligent service provider, and optionally, the intelligent service provider may further include other possible components not shown, such as a memory, a radio frequency stage, a baseband processing unit, a network interface, a controller, and the like. The processing circuitry may be associated with a memory and/or an antenna. For example, the processing circuitry may be directly or indirectly (e.g., other components may be connected in between) connected to the memory for data access. Also, for example, the processing circuitry may be directly or indirectly connected to the antenna to transmit signals via the communication unit and receive radio signals via the communication unit.

The memory may store various kinds of information, for example, service related information generated by the processing circuitry 702, performance information, characteristic information of the intelligent service provider, etc., as well as programs and data for operation by the intelligent service provider, data to be transmitted by the intelligent service provider, and the like. The memory may also be located inside the intelligent service provider but outside of the processing circuitry, or even outside of the intelligent service provider. The memory may be a volatile memory and/or a non-volatile memory. For example, the memory may include, but is not limited to, random access memory (RAM), dynamic random-access memory (DRAM), static random-access memory (SRAM), read-only memory (ROM), and flash memory.

According to an embodiment, there proposes a method for providing intelligent service in a telecom communication system, the telecom communication system including a number of intelligent service providers, the method comprises: for a service request from a service requester, causing an intelligent service provider in the number of intelligent service providers as a master intelligent service provider to perform federated learning in coordination with at least one of at least one additional intelligent service provider as slave intelligent service provider, and merging service-related information obtained from the at least one slave intelligent service via the federated learning by the master intelligent service provider so as to provide intelligent service for the service requester.

Figure 7B:
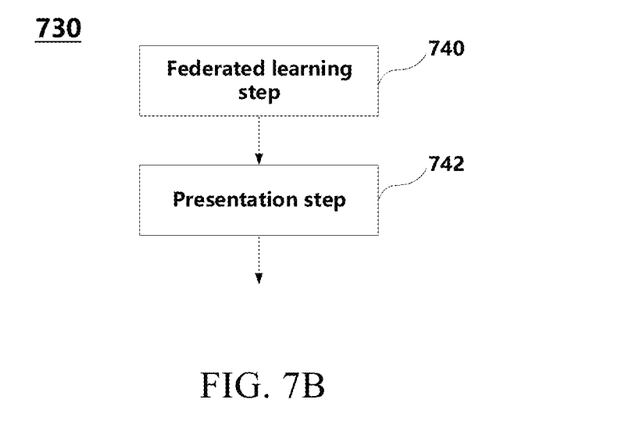
FIG. 7B illustrates a flowchart of a method of providing intelligent service according to an embodiment of the present disclosure.

FIG. 7B illustrates a flowchart of the intelligent service providing method according to the exemplary embodiment of the present disclosure. The method 730 includes a federated learning step 740 and a presenting step 742 which can perform the operations as described above. Similar with the above, the federated learning step can further include some sub steps of receiving, establishing and processing, and the presenting step can further include some sub steps of merging and outputting.

It should be noted that the method according to the present disclosure may further include operation steps corresponding to operations performed by the processing circuitry of the above-mentioned electronic device, which will not be described in detail here. It should be noted that each operation of the method according to the present disclosure may be performed by the aforementioned intelligent service provider, in particular by a processing circuitry or a corresponding unit, which will not be described in detail here.

According to another embodiment of the present application, there proposed an intelligent service provider in a telecom communication system, the telecom communication system including the intelligent service provider and at least one another intelligent service provider, the intelligent service provider comprise a processing circuitry configured to: for a service request from a service requester, cause the intelligent service provider to serve as a slave intelligent service provider to perform federated learning in coordination with one of the at least one another intelligent service provider as a master intelligent service provider, and provide service-related information obtained via the federated learning to the master intelligent service provider so that an intelligent service can be provided by the master intelligent service provider for the service requester.

Preferably, the service-related information includes intelligent model parameters, and the slave intelligent service provider is configured to provide the intelligent model parameters to the master intelligent service provider periodically or based on a request from the master intelligent service provider.

Preferably, the processing circuitry is further configured to: request global service model parameters from the master intelligent service provider, and update the model parameters of the slave intelligent service provider according to the received global service model parameters.

Figure 8A:
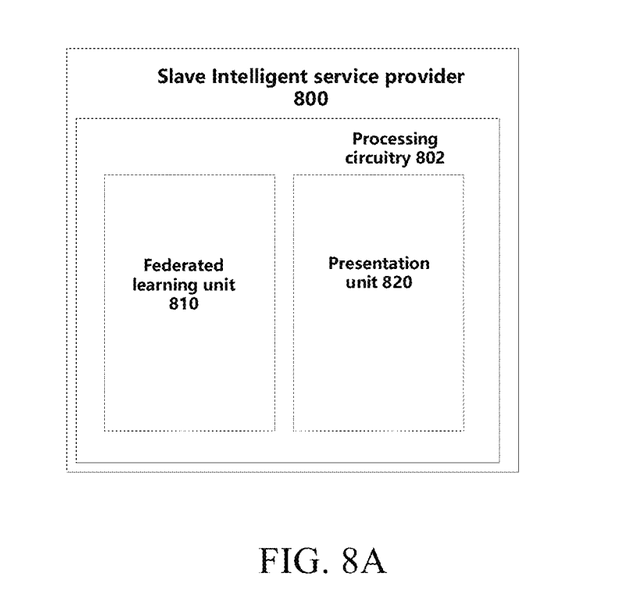
FIG. 8A illustrates a block diagram of an intelligent service provider according to an embodiment of the present disclosure.

The slave intelligent service provider can be implemented in a variety of manners as that discussed for the master intelligent service provider, and FIG. 8A schematically illustrates an exemplary embodiment of the slave intelligent service provider 800, which includes a federal learning unit 810 and presentation unit 820 for performing the operations of the processing circuity, and can further include other units, such as a requesting unit, a updating unit for performing the operations of the processing circuity, or communication units for communicating data and information similar with that as described above. At least one of such units can be included in the processing circuitry 802 as exemplarily shown in FIG. 8A, and also can be outside of the processing circuitry, even outside of the intelligent service provider.

According to an embodiment of the present application, there proposes a method for providing intelligent service in a telecom communication system, the telecom communication system including a number of intelligent service providers, the method comprises: for a service request from a service requester, causing the intelligent service provider to serve as a slave intelligent service provider to perform federated learning in coordination with one of the at least one another intelligent service provider as a master intelligent service provider, and providing service-related information obtained via the federated learning to the master intelligent service provider so that an intelligent service can be provided by the master intelligent service provider for the service requester.

Figure 8B:
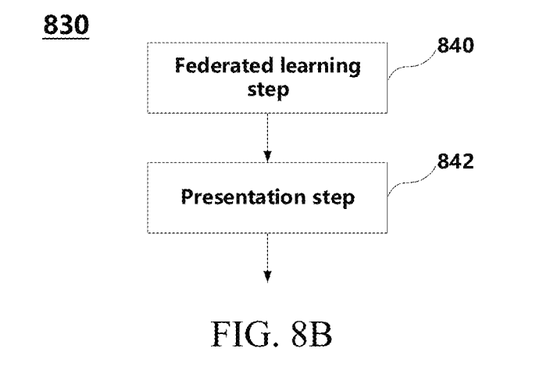
FIG. 8B illustrates a flowchart of a method of providing intelligent service according to an embodiment of the present disclosure.

FIG. 8B illustrates a flowchart of the intelligent service providing method according to the exemplary embodiment of the present disclosure. The method 830 includes a federated learning step 840 and a presenting step 842 which can perform the operations as described above. The method can further include other steps, such as a requesting step, an updating step for performing the operations of the processing circuity.

It should be noted that the method according to the present disclosure may further include steps corresponding to operations performed by the processing circuitry of the above-mentioned electronic device, which will not be described in detail here. It should be noted that each operation of the method according to the present disclosure may be performed by the aforementioned intelligent service provider, in particular by a processing circuitry or a corresponding unit, which will not be described in detail here.

It should be noted that the above description is only exemplary. The embodiments of the present disclosure can also be executed in any other appropriate manner, and the advantageous effects obtained by the embodiments of the present disclosure can still be achieved. Moreover, the embodiments of the present disclosure can also be applied to other similar application examples, and the advantageous effects obtained by the embodiments of the present disclosure can still be achieved. It should be understood that machine-executable instructions in the machine-readable storage medium or program product according to the embodiments of the present disclosure may be configured to perform operations corresponding to the above-mentioned device and method embodiments. When referring to the above embodiments of the device and method, the embodiments of the machine-readable storage medium or the program product are clear to those skilled in the art, and therefore will not be described repeatedly. Machine-readable storage media and program products for carrying or including the aforementioned machine-executable instructions also fall within the scope of the present disclosure. Such a storage medium may include, but is not limited to, a floppy disk, an optical disk, a magneto-optical disk, a memory card, a memory stick, and the like.

Figure 9:
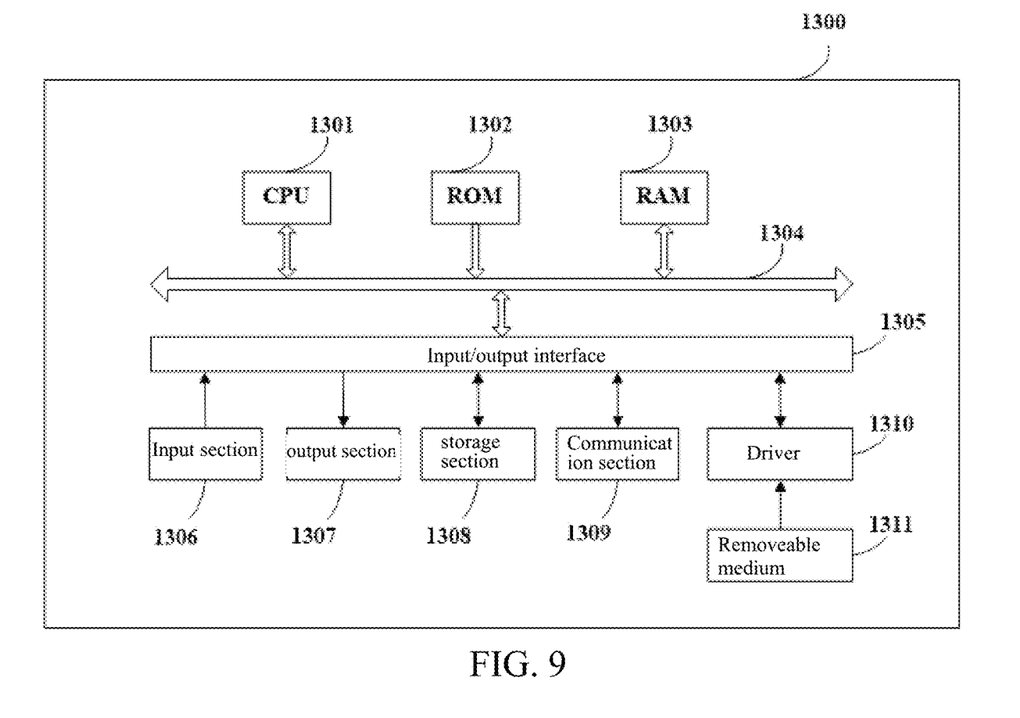
FIG. 9 illustrates an outline of a computer system in which embodiments according to the present disclosure may be implemented.

In addition, it should be understood that the series of processes and devices as described above may also be implemented by software and/or firmware. In the case of being implemented by software and/or firmware, a corresponding program constituting the corresponding software is stored in a storage medium of the related device, and when the program is executed, various functions can be achieved. As an example, a program constituting the software can be installed from a storage medium or a network to a computer having a dedicated hardware structure, such as a general-purpose computer 1300 shown in FIG. 9, and the computer is capable of executing various functions and so on when various programs are installed. FIG. 9 is a block diagram showing an exemplary structure of a computer as an example of an information processing apparatus that can be employed in an embodiment according to the present disclosure. In one example, the computer may correspond to the above-described exemplary electronic device on the intelligent service provider side or the electronic device on the application side according to the present disclosure.

In FIG. 9, a central processing unit (CPU) 1301 performs various processes according to a program stored in a read only memory (ROM) 1302 or a program loaded from a storage section 1308 to a random-access memory (RAM) 1303. In the RAM 1303, data required when the CPU 1301 executes various processes and the like is also stored as necessary.

The CPU 1301, the ROM 1302, and the RAM 1303 are connected to each other via a bus 1304. An input/output interface 1305 is also connected to the bus 1304.

The following components are connected to the input/output interface 1305: the input section 1306 including a keyboard, a mouse, etc.; the output section 1307 including a display, such as a cathode ray tube (CRT), a liquid crystal display (LCD), etc. and a speaker, etc.; the storage section 1308 including hard disks, etc.; and communication section 1309 including network interface cards such as LAN cards, modems, etc. The communication section 1309 performs communication processing via a network such as the Internet.

The driver 1310 can also be connected to the input/output interface 1305 as needed. The removable medium 1311 such as a magnetic disk, an optical disk, a magneto-optical disk, a semiconductor memory, etc. is installed on the driver 1310 as needed, so that a computer program read out therefrom is installed into the storage section 1308 as needed.

In the case where the above-mentioned series of processing is realized by software, a program constituting the software is installed from a network such as the Internet or a storage medium such as a removable medium 1311.

Those skilled in the art should understand that a storage medium is not limited to the removable medium 1311 shown in FIG. 8 in which the program is stored and which is distributed separately from the device to provide the program to the user. Examples of removable media 1311 include magnetic disks (including floppy disks), optical disks (including CD-ROMs and digital versatile disks (DVDs)), magneto-optical disks (including mini disks (MD) ™) and semiconductor memory. Alternatively, the storage medium may be ROM 1302, a hard disk included in the storage portion 1308, and the like, in which programs are stored, and are distributed to users along with the device containing them.

In addition, it should be understood that multiple functions included in one unit in the above embodiments may be implemented by separate devices. Alternatively, multiple functions implemented by multiple units in the above embodiments may be implemented by separate devices, respectively. In addition, one of the above functions can be implemented by multiple units. Needless to say, such configuration is included in the technical scope of the present disclosure.

Herein, the steps illustrated in the flowchart include not only processes performed in the described order in time series, but also processes performed in parallel or individually instead of having to be performed in time series. Further, even in the steps processed in time series, needless to say, the order can be appropriately changed.

Although the present disclosure and its advantages have been described in detail, it should be understood that various changes, substitutions and alterations can be made hereto without departing from the spirit and scope of the present disclosure as defined by the appended claims. Moreover, the terms "including", "comprising", or any other variation thereof, of the embodiments of the present disclosure are intended to cover non-exclusive inclusion, so that a process, method, article, or device that includes a series of elements includes not only those elements, but includes other elements not explicitly listed, or also elements inherent to such a process, method, article, or device. Without more restrictions, the elements defined by the sentence "including a . . . " do not exclude a case that in the process, method, article, or device that includes the elements, other identical elements exist.

Although some specific embodiments of the present disclosure have been described in detail, those skilled in the art should understand that the above embodiments are merely illustrative and do not limit the scope of the present disclosure. Those skilled in the art should understand that the above embodiments may be combined, modified, or replaced without departing from the scope and essence of the present disclosure. The scope of the present disclosure is defined by the appended claims.

What is claimed is:

1. An intelligent service provider having a Network Data Analytics Function (NWDAF) in a telecom communication system, the telecom communication system including the intelligent service provider and at least one additional intelligent service provider, the intelligent service provider comprise a processing circuitry configured to:
    for a service request from a service requester, cause the intelligent service provider to serve as a master intelligent service provider to perform federated learning in coordination with at least one of the at least one additional intelligent service provider as slave intelligent service provider,
    merge service-related information obtained from the at least one slave intelligent service and service-related information of the master intelligent service provider so as to provide intelligent service for the service requester, and/or provide merged service-related information to slave intelligent service provider,
    wherein the service-related information includes artificial intelligence model and/or artificial intelligence model parameters, and the processing circuitry is configured to:
        merge the intelligent service model or model parameters provided by the at least one slave intelligent service provider to build a global intelligent service model, and
        utilize the global intelligent service model to provide intelligent services for the service requester.

2. The intelligent service provider according to claim 1, wherein the intelligent service provider serves as the master intelligent service provider according to at least one of the following principles:
    the intelligent service provider firstly receiving the service request;
    the intelligent service provider being coordinated as the master intelligent service provider by a plurality of service requesters;
    the intelligent service provider being pre-configured as the master intelligent service provider; and
    the intelligent service provider having better service capability than any of the at least one slave intelligent service provider.

3. The intelligent service provider according to claim 2, wherein the service capability is at least one of a computing capability and a resource utilization rate of the intelligent service provider.

4. The intelligent service provider according to claim 1, wherein the at least one slave intelligent service provider is pre-configured, or is configured by the master intelligent service provider for the service request.

5. The intelligent service provider according to claim 1, wherein the processing circuitry is configured to:
    based on amount of available trained data and/or based on performance indicators provided by an additional intelligent service provider, determine whether the additional intelligent service providers can participate in federated learning as the slave intelligent service provider.

6. The intelligent service provider according to claim 5, wherein the performance indicator includes at least one of throughput, reliability, and delay of the intelligent service provider.

7. The intelligent service provider according to claim 1, wherein the processing circuitry is configured to switch on or switch off the federated learning according to a request from a service requester or a performance of the intelligent service provider.

8. The intelligent service provider according to claim 1, wherein the processing circuitry is configured to determine whether the service-related information provided by the slave intelligent service provider is available according to an activity level of the slave intelligent device or performance-related information provided by the slave intelligent service provider.

9. The intelligent service provider according to claim 8, wherein the performance-related information indicates whether a service performance difference from the slave intelligent service provider is greater than a specific threshold, and in a case where the indicator indicates that the service performance difference is greater than the specific threshold, it is judged that the service-related information provided from the slave intelligent service provider is available.

10. The intelligent service provider according to claim 8, wherein the performance-related information is a service performance metric of the slave intelligent service provider, and the processing circuitry is configured to:
    calculate the difference between a current service performance metric and a previous service performance metric of the slave intelligent service provider,
    in a case where the difference is greater than a specific threshold, judge that the service-related information provided by the intelligent service provider is available.

11. The intelligent service provider according to claim 1, wherein the service-related information includes a partial service result, and the processing circuitry is configured to:
    merge the partial service results provided by the at least one slave intelligent service provider to provide an intelligent service for the service requester.

12. The intelligent service provider according to claim 1, wherein the processing circuitry is configured to feed back parameters of the global intelligent model to the at least one slave intelligent service provider for updating, periodically or according to a request from the slave intelligent service provider.

13. The intelligent service provider according to claim 1, wherein the slave intelligent service provider provides model parameters to the master intelligent service provider, periodically or according to a request from the master intelligent service provider.

14. An intelligent service provider having a Network Data Analytics Function (NWDAF) in a telecom communication system, the telecom communication system including the intelligent service provider and at least one another intelligent service provider, the intelligent service provider comprise a processing circuitry configured to:
   for a service request from a service requester, cause the intelligent service provider to serve as a slave intelligent service provider to perform federated learning in coordination with one of the at least one another intelligent service provider as a master intelligent service provider,
   provide service-related information obtained via the federated learning to the master intelligent service provider so that an intelligent service can be provided by the master intelligent service provider for the service requester,
   wherein the service-related information includes artificial intelligence model and/or artificial intelligence model parameters, and the processing circuitry is configured to:
      merge the intelligent service model or model parameters provided by the at least one slave intelligent service provider to build a global intelligent service model, and
      utilize the global intelligent service model to provide intelligent services for the service requester.

15. The intelligent service provider according to claim 14, wherein the service-related information includes intelligent model parameters, and the slave intelligent service provider is configured to provide the intelligent model parameters to the master intelligent service provider periodically or based on a request from the master intelligent service provider.

16. The intelligent service provider according to claim 14, wherein the processing circuitry is further configured to:
   request global service model parameters from the master intelligent service provider, and
   update the model parameters of the slave intelligent service provider according to the received global service model parameters.

17. A computer-readable storage medium storing instructions that, when executed by one or more processors, cause performance of a method for providing intelligent service in a telecom communication system, the telecom communication system including a number of intelligent service providers, the method comprising:
   for a service request from a service requester, causing an intelligent service provider in the number of intelligent service providers as a master intelligent service provider to perform federated learning in coordination with at least one of at least one additional intelligent service provider as slave intelligent service provider,
   merging service-related information obtained from the at least one slave intelligent service via the federated learning by the master intelligent service provider so as to provide intelligent service for the service requester,
   wherein the service-related information includes artificial intelligence model and/or artificial intelligence model parameters, and the method further comprises:
      merging the intelligent service model or model parameters provided by the at least one slave intelligent service provider to build a global intelligent service model, and
      utilizing the global intelligent service model to provide intelligent services for the service requester.

* * * * *